United States Patent [19]
Lyon

[11] 3,768,240
[45] Oct. 30, 1973

[54] CROP HARVESTING MACHINES
[75] Inventor: Claude Bernard Lyon, Venelles, France
[73] Assignee: Agence Nationale De Valorisation De La Recherche A.N.V.A.R., Paris, France
[22] Filed: July 12, 1972
[21] Appl. No.: 271,050

[30] Foreign Application Priority Data
July 13, 1971 France .............................. 7125671

[52] U.S. Cl. ..................................... 56/330, 56/130
[51] Int. Cl. ............................................. A01g 19/00
[58] Field of Search ...................... 56/327 R, 327 A, 56/328 R, 330, 130, 30, 29, 33, 34, 35, 126-129

[56] References Cited
UNITED STATES PATENTS
1,975,572  10/1934  Guyle.................................. 56/126
3,142,949  8/1964  Carlson................................. 56/128
3,396,521  8/1968  McKibben et al. ................... 56/330
3,449,895  6/1969  Pertics ................................. 56/330
3,466,859  9/1969  Humphries....................... 56/327 R
3,527,036  9/1970  Siebol .................................. 56/130
3,596,457  8/1971  Van Tine et al..................... 56/330
3,720,050  3/1973  Rozinska.............................. 56/330

Primary Examiner—Russell R. Kinsey
Attorney—Joseph M. Fitzpatrick et al.

[57] ABSTRACT

A harvesting machine for harvesting fruits growing on plants having flexible stems and planted in rows, the machine comprising means for inclining and keeping inclined in at least one row said plants; a plurality of rotary threshers disposed above said row; and also comprising below said row means for recovering and transferring the fruits to a receiving tank.

9 Claims, 5 Drawing Figures

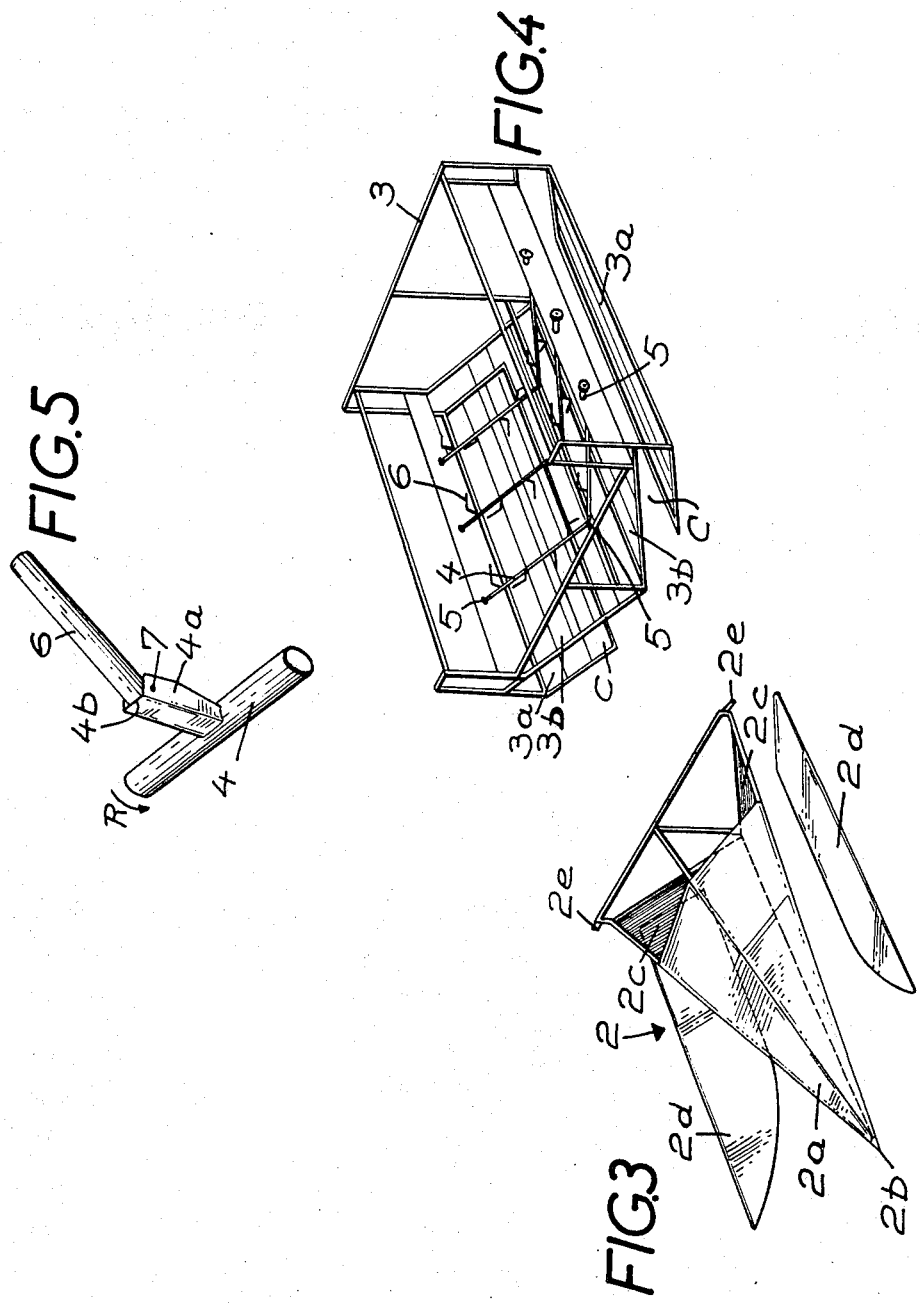

CROP HARVESTING MACHINES

This invention relates to a wheeled harvesting machine for harvesting small fruits growing on bushes or hedges having flexible stems and planted in rows.

It is known that the harvesting of small fruits, particularly in the care of large plantations, sets considerable problems to planters who find themselves obliged to employ numerous personnel so that picking can be effected as quickly as possible. This method of working is very onerous, and as the need for hand-labour increases, it becomes less available.

Mechanisation of the picking of such crops of this type has already been considered and machines have been produced for this purpose, which comprise flails for threshing the vegetable stems, these flails being supported and rotated by vertical shafts.

These machines have the drawback of causing a substantial quantity of the crop to fall onto the ground and as a result it has then to be picked up which can only be done by hand. The planters are therefore forced to employ, in addition to machines personnel for recovering the fruits left on the ground.

It is an object of the present invention to obviate or mitigate these drawbacks and to provide a harvesting machine which reduces the need for hand-labour.

According to the present invention there is provided a harvesting machine for harvesting fruits growing on plants having flexible stems and planted in rows, the machine comprising a frame including two non-vertical parallel faces defining at least one channel for receiving plant stems, threshing means disposed above at least one part of the channel, means for recovering fruits removed from the stems by the threshing means and for discharging them towards a receptacle.

As a result of this arrangement the fruits, removed from their stems by the threshers fall directly onto the conveyor which discharges them towards a receptacle.

A machine according to the invention comprises, preferably, at the front a device for separating the stems which comprises on the one hand, a divider having the general shape of a pyramid, symmetrical with respect to a vertical plane parallel to the longitudinal axis of the machine, and the tip of which is directed forwards and the side faces of which diverge from the front to the back and upwards, and on the other hand, two lateral lifting members disposed beneath said side faces which are substantially parallel to those with which they define two channels.

The result of this arrangement is to separate the plants into two rows which are kept inclined as the machine passes therethrough and which lie below the threshers and above the conveyors.

The frame of a machine according to the invention, placed immediately behind the separating device preferably comprises two channels symmetrical with respect to the vertical plane through which the longitudinal axis of the machine passes, each of these channels being defined by two parallel grids made of longitudinal bars, and the threshing means rotated by rods perpendicular to the bars, and are located in planes substantially parallel to said grids and above said channels, which threshing means is arranged between said bars.

The result of this arrangement is that the threshing means strike perpendicular to the stems by passing between the bars of the grids and the plants are not damaged by their contact with the bars due to the longitudinal arrangement of the latter.

Preferably, the side faces of the divider and the lifting members are located in the extension of the grids defining the channels due to which the plants are easily inserted into the channels of the frame.

The threshing means is constituted by flexible elements, for example rods or tubes or else by elements pivoted in the manner of a flail.

These arrangements allow the flails to strike the stems then to fold themselves up so as to disappear by sliding over the stems without damaging them.

The conveyors located beneath the channels are preferably consituted by travelling belts located in planes substantially parallel to said channels and perpendicular to the longitudinal axis of the machine, conveyors moving outwardly and being supported so that they can be moved away from or towards each other symmetrically with respect to the verical plane through which the longitudinal axis of the machine passes.

The frame may move vertically and the movements of the conveyors are synchronised with the movements of the frame so that the conveyors are moved away from each other when the frame is raised and are moved towards each other when the frame moves down.

Due to the fact that the height and thickness of the plants cultivated vary substantially in the same direction, this arrangement makes it possible to adjust the distance between the two conveyors and at the same time the height of the latter.

Crop recovery and transfer are effected by means of inclined recovery conveyors which are disposed beneath the threshers and which divert the harvested products on either side of the machine into a substantially horizontal conveyor, the products then being picked up by an inclined elevator which diverts them by gravity into a receptacle, the latter path being traversed by a flow of air produced by at least one fan or aspirator mounted on said machine.

An embodiment of the present invention will now be described, by way of example, with reference to the accompanying drawings, in which:

FIG. 3 is a perspective view of the device for separating the plants,

FIG. 4 is a perspective view of the frame which supports the threshers.

FIG. 5 is a perspective view of a thresher mounted in the manner of a flail on a rotating pin.

Figure 1:
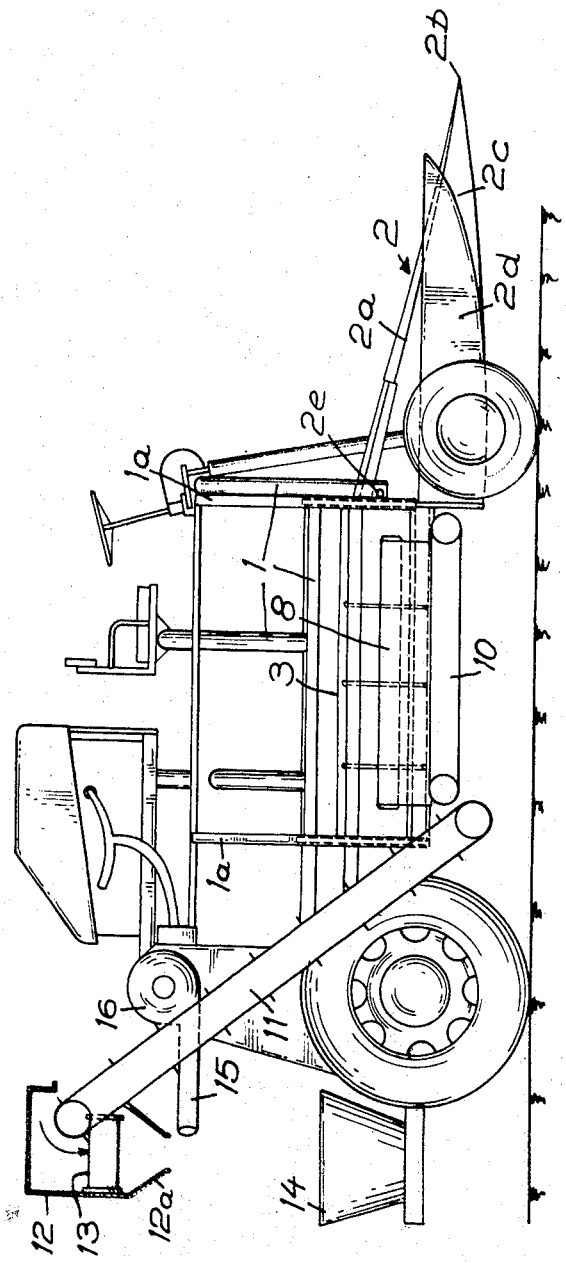
FIG. 1 is an elevation of the harvesting machine according to the invention.
Figure 2:
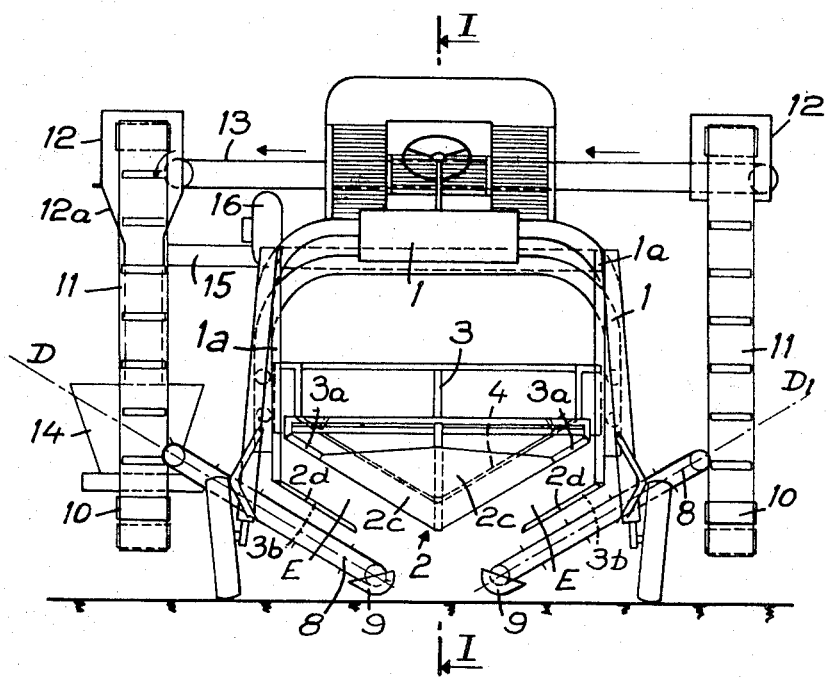
FIG. 2 is a front view of the harvesting machine according to the invention.

Reference is made firstly to FIGS. 1 and 2 which show a harvesting machine according to the invention incorporating a straddle tractor 1, at the front of which there is disposed a separating device 2 (FIG. 3) constituted, on the one hand, by a divider 2a having the shape of a pyramid symmetrical with respect to the central vertical plant I — I of the machine, the tip 2b of the divider being directed forwards and its two lateral faces 2c lying in planes diverging upwards; and, on the other hand, by two lateral lifting members 2d which are substantially parallel to the diverging faces 2c and thus define a channel E with the latter. This separating device 2 is mounted to pivot about two pins 2e and is provided with means which can lift it while the machine travels to its working site and can lower it into its operating position.

There is arranged immediately behind separating device 2, substantially in the centre of the tractor, a frame 3 (FIG.4) which comprises on each side and in an inclined position, a lower grid 3a which extends towards the lifting member 2d and an upper grid 3b which extends towards the diverging face 2c, thus forming a channel C between them.

Several rods 4 are arranged parallel to the upper grid 3b and are rotatably mounted in bearings 5. Each rod 4 mounts, for example three, equi-spaced threshers 6 at right angles to each other in the manner of a flail and each is pivoted to a U-shaped stirrup 4a integral with the rod 4. Each stirrup 4a provides a central abutment 4b, and its flanges are apertured to receive a pin 7. Each thresher 6 is disposed at one end inside the stirrup 4a and this end is apertured for passage of the pin 7 which is conveniently secured in position.

The rods 4 are rotated by means of pinions and chains driven by a motor (or from the tractor power take-off).

The grids 3a, 3b are made of longitudinal bars extending over the entire length of the frame 3.

The frame 3 is mounted to slide or roll along four vertical ramps 1a secured to the framework of the tractor 1 and accordingly can be moved vertically.

There are disposed beneath the grids 3b of the frame 3, and parallel to the grids, two recovery conveyors 8 extending beneath the entire area of the grids 3b in an arrangement permitting them to move away from or towards each other symmetrically with respect to the central plane I — I of the machine, in two directions $D/D_1$, oblique and parallel to said grids 3b.

These two recovery conveyors 8 follow the vertical movement of the frame 3 so that they move apart as they are raised and move together as they are lowered. The conveyors may be provided with longitudinal bars or equivalent means for holding and conveying the harvested products.

Each of these conveyors 8 is provided, at the end nearer the ground, with a trough 9 enclosing the lower part of said end.

On each side of the machine and beneath the upper end of the recovery conveyor 8 there is horizontally arranged conveyor 10 having scraper members, which conveyors 10 extend along the length of the recovery conveyors 8. The harvested products transported by the conveyors 8 are picked up by an inclined elevator 11 (possibly a bucket elevator) the lower end of which is located beneath the rear end of the horizontal conveyor 10. The elevator 11 extends obliquely towards the rear of the machine and there is at the top of the machine a casing 12 surrounding the upper part of the elevator 11. One of the elevators 11, i.e. that located on the right of the drawing (FIG. 2) diverts the harvested products into a transverse and horizontal conveyor 13 having scrapers and disposed at the upper part of the machine, which conveyor 13 extends towards the other elevator 11 located on the left so as to divert the harvested products conveyed by the two elevators into a single receiving tank or bin 14.

Alternatively, each elevator may divert the products into an individual tank or bin disposed under each of them.

The casing 12 surrounding the elevator located on the left of the drawing has a chute 12a for diverting the harvested product towards the tank 14. Beneath and at the outlet of the chute 12a there is disposed an air nozzle 15 a fan or aspirator 16 carried by the machine. A valve mounted in the nozzle 15 regulates the supply of air egressing therefrom.

The machine may also be provided with a means permitting it to divert the harvested products or fruits into a receptacle progressing alongside said machine.

For this purpose, the machine is provided with an inclined conveyor extending from the region of the receiving tank 14 and extending in cantilever fasion outwardly of the machine such that its upper end is located above the receptacle (mobile hopper).

The machine operates in following manner:

Firstly, the position of the frame 3 and the separating device 2 are adjusted in accordance with the height of the bushes or hedges. The latter, planted in line, are separated and inclined by the separating device 2, which comprises the divider 2a and the lateral lifting members 2d. As the machine proceeds forwards, the bushes or hedges maintained inclined are received into the channels C of the frame 3 and are threshed by the rotating flails 6 which pivot downwardly during their passage beneath the rods 4 on which they are mounted. The fruits and leaves are thus separated from their stems. The crop in the raw state is discharged by the recovery conveyors 8 which diverts it into the horizontal conveyors 10. At the end of the conveyors 10 it is picked up by the inclined elevators 11 and is finally diverted, by gravity into the receiving tank 14. An air flow produced by the nozzle 15, whose output is adjustable passes through the falling crop so as to separate any leaves from the fruits, the supply of air being increased or decreased depending on the density of the leaves and fruits.

The frequency of rotation of the flails may vary.

The movements of various devices are hydraulically effected, in particular the vertical movement of the carriage 3 at the same time as the oblique movements of the recovery conveyors 8.

I claim:

1. A harvesting machine for harvesting fruits growing on plants having flexible stems and planted in rows the machine comprising a mobile ground support frame including means having two non-vertical parallel faces defining at least one channel for receiving plant stems, threshing means movably supported on said frame and adapted to penetrate the channel from above to thresh fruit from plants, stalks, stems, etc. disposed therein; and means also supported by said frame for recovering fruits removed from the stems by the threshing means and for discharging them towards a receptacle.

2. A machine according to claim 1, comprising, at the front of the frame a device for separating the stems, and including a divider of general pyramidal shape, symmetrical with respect to a vertical plane parallel to the longitudinal axis of the machine, and the tip of which divider is directed forwardly of the frame and the side faces of which diverge from the front to the back and upwards, and two lateral lifting members disposed beneath the side faces and substantially parallel with the side faces with which they define two channels.

3. A machine according to claim 1, wherein there are two channels symmetrical with respect to the vertical plane through which the longitudinal axis of the machine passes, said first mentioned means having two additional non-vertical parallel faces which define the second channel, each of these channels being defined by two parallel grids, formed by longitudinal bars which have said faces, the threshing means being movally supported on said frame by; rotatable rods disposed perpendicular to the bars and located in planes substantially parallel to the grids and above said channels, which threshing means is adapted to move between the bars.

4. A machine according to claim 2, wherein the rear ends of the side faces of the divider and the rear ends of the lifting members are aligned with the planar parallel faces of said means which define said channels formed by said frame.

5. A machine according to claim 3, wherein the threshing means are constituted by flails, each consisting of two parts pivoted to each other, one part of which is integral with the drive rod and forms an abutment which restricts the pivoting of the other part.

6. A machine according to claim 1, wherein the means for recovering the fruits comprises recovery conveyors located in planes substantially parallel to said channels and perpendicular to the longitudinal axis of the machine, the conveyors moving outwardly of the frame.

7. A machine according to claim 6, wherein said recovery conveyors have troughs parallel to the longitudinal axis of the machine and located at the bottom of the conveyors.

8. A machine according to claim 6 wherein the recovery conveyors deliver the fruit onto a substantially horizontal longitudinal conveyor, each of which delivers the fruit onto an elevator, the fruits thereafter falling into receptacles carried by the machine after passing through an air flow produced by blowing means carried by the machine, so as to separate leaves from the fruit.

9. A machine according to claim 8, wherein the elevators deliver the fruits onto a substantially horizontal transverse conveyor located at the upper part of the machine, the fruits falling off said transverse conveyor into a separate receptacle after passing through the separating air flow.

* * * * *